United States Patent [19]
Pletz-Kirsch et al.

[11] Patent Number: 5,144,433
[45] Date of Patent: Sep. 1, 1992

[54] INTERFERENCE-FREE DIGITAL SYNCHRONIZING SIGNAL DETECTOR FOR TV

[75] Inventors: Gerhard Pletz-Kirsch; Jügen Lenth, both of Hamburg, Fed. Rep. of Germany

[73] Assignee: U.S. Philips Corporation, New York, N.Y.

[21] Appl. No.: 587,315

[22] Filed: Sep. 21, 1990

[30] Foreign Application Priority Data

Sep. 23, 1989 [DE] Fed. Rep. of Germany ....... 3931860

[51] Int. Cl.$^5$ .......................... H04N 5/08; H04N 5/10
[52] U.S. Cl. .................................... 358/155; 358/153
[58] Field of Search ............... 358/153, 154, 155, 148, 358/158; 307/358, 359; 328/139

[56] References Cited

U.S. PATENT DOCUMENTS

| | | | |
|---|---|---|---|
| 3,819,859 | 6/1974 | Borsuk et al. | 358/154 |
| 4,238,770 | 12/1980 | Kobayashi et al. | 358/154 |
| 4,468,628 | 8/1984 | Tandart et al. | 328/139 |
| 4,556,905 | 12/1985 | Ikejiri | 358/154 |
| 4,697,211 | 9/1987 | Balaban et al. | 358/153 |
| 4,707,740 | 11/1987 | Straton | 358/153 |
| 4,821,098 | 4/1989 | Smeulers | 358/153 |

FOREIGN PATENT DOCUMENTS

| | | | |
|---|---|---|---|
| 0244239 | 11/1987 | European Pat. Off. | |
| 56-078281 | 6/1981 | Japan | 358/155 |
| 57-155882 | 9/1982 | Japan | 358/155 |
| 2085690 | 4/1982 | United Kingdom | 358/153 |

Primary Examiner—James J. Groody
Assistant Examiner—Safet Metjahic
Attorney, Agent, or Firm—Bernard Franzblau

[57] ABSTRACT

A signal detector circuit arrangement for detecting synchronizing pulses contained in a digital television signal by the use of a separating stage wherein, during the time intervals in which television signal portions are separated in the separating stage and at the same time an instantaneous sampling value exceeds a stored sampling value in the direction of the level of the synchronizing pulses, the stored sampling value is replaced by the instantaneous sampling value and simultaneously a marker pulse is generated. In each time interval between consecutive synchronizing pulses, the stored sampling value is erased at a presettable instant which is identical for all the time intervals. The final marker pulse of such an erasing procedure marks a detected synchronizing pulse.

8 Claims, 3 Drawing Sheets

INTERFERENCE-FREE DIGITAL SYNCHRONIZING SIGNAL DETECTOR FOR TV

FIELD OF THE INVENTION

This invention relates to a digital circuit arrangement for detecting horizontal or vertical synchronizing pulses which are contained in a digital television signal and whose amplitude extends to approximately a peak level, including a separating stage which separates those signal portions of the television signal that exceed a cut-off level in the direction of a peak level.

BACKGROUND OF THE INVENTION

With circuit arrangements of this type for detecting the synchronizing pulses, these pulses are mostly detected because those signal portions of the television signal which exceed a cut-off level in the direction towards the peak level are separated in a separating stage. The separated signal portions then represent in a way the synchronizing pulses. However, this procedure is beset with significant errors when the television signal is disturbed. If the synchronizing pulses do not always have an adequate amplitude i.e., which exceeds the cut-off level, then no synchronizing pulses are separated. A further problem is that the cut-off level often does not have the correct value and thus faulty or no synchronizing pulses are detected.

In the majority of prior art circuit arrangements the cutoff level is recovered in that, at the instants in which synchronizing pulses are expected, which is, for example, determined by a subsequent phase control circuit, the level of the television signal is determined and subsequently the cut-off level is set to a slightly lower level. This procedure functions, however, only then when the intervals in which the level of the television signal is determined accurately coincides with the synchronizing pulses. In the event of a desynchronization, however little, of the subsequent phase control loop the level of the television signal is then, for example, determined in the region of the porch of the signal. This immediately results in an erroneous cut-off level.

The European Patent Application No. 0,244,239 discloses a separating stage for synchronizing pulses in which the edges of the synchronizing pulses are detected. The signal then recovered is utilised to generate the cut-off level. However, this requires fixed assumptions about the edge steepness of the synchronizing pulses. Only when these boundary conditions are present can the edges of the pulses be detected. If, however, the criteria for the edges are not reached anymore, for example in the case of a disturbed television signal, an erroneous signal portion of the television signal may be detected as a synchronizing pulse. This then results in an erroneous fixing of the cut-off level with the above-described consequences.

SUMMARY OF THE INVENTION

The invention has for its object to provide a digital circuit arrangement of the type defined in the opening paragraph which, particularly in the case of a disturbed television signal, provides a fail-safe recognition of the synchronizing pulses.

According to the invention, this object is accomplished, in that a level detector is provided in which, during those time intervals in which television signal portions are separated in the separating stage and simultaneously the instantaneous sampling value exceeds a stored sampling value in the level-direction of the synchronizing pulses, the stored sampling value is replaced by the instantaneous sampling value and a marker pulse is generated. Furthermore, in each time interval between consecutive synchronizing pulses the stored sampling value is erased at a predetermined instant which is the same for all of the time intervals, and that the last marker pulse occurring before erasing of the stored sampling value always marks a detected synchronizing pulse.

Between consecutive synchronizing pulses the store containing the sampling value is cleared at a predetermined instant which is identical for all of the time intervals. Starting with this instant, the actual sampling value is consequently always compared with the value zero, so that when signal portions are separated for the first time in the separating state, the sampling value then obtained will most probably exceed zero, so that this sampling value is entered into the memory and simultaneously a marker pulse is set. Thereafter, a marker pulse is then only generated at the separation of signal portions in the separating stage when simultaneously the sampling value has a higher value than the sampling value stored. This continues until the next erasing procedure of the memory. Acting thus it is ensured that the last marker pulse occurring between two erasing procedures of the store is that marker pulse which corresponds to a maximum level of the television signal. Consequently, this marker pulse marks the detected synchronizing pulse.

So in this circuit arrangement for detecting the synchronizing pulses two criteria are used. The first criterion is that the television signal exceeds the cut-off level towards the peak level. These signal portions are separated in a separating stage in known manner. As is described in the foregoing, the cut-off level can however have an erroneous value in certain circumstances, wherefore a second criterion is used. This second criterion consists in that the relative level of the sampling values is simultaneously taken into consideration to determine the synchronizing pulses. This is based on the assumption that the synchronizing pulse has the highest level. This assumption may even be true when the television signal is disturbed. Fluctuations in the level of the overall television signal or also of the synchronizing pulses do not have any further disturbing effect, as in each time interval between two erasing procedures of the memories the level detection is restarted again from zero and consequently fluctuating levels of the television signal do not have any negative effect. It is then not necessary to make fixed assumptions about the level of the synchronizing pulses or of its pulse shape.

This circuit arrangement has the additional advantage that the manner in which the cut-off level is determined can be chosen at one's option. Nevertheless, even in the case of an erroneous cut-off level, the synchronization of a subsequent phase control loop is significantly facilitated as the last marker pulse between two erasing procedures of the memory will, with a high degree of probability, indicate the correct synchronizing pulse, even when the cut-off level was determined erroneously. Thus, a subsequent phase control loop is synchronized in a significantly faster manner. Should the peak level be determined in dependence on the signals of a subsequent phase control loop in a manner such that at the anticipated instants of the synchronizing pulses a level value is taken from the television signal, in dependence on which the level of the peak level is determined, then, since the phase control loop is correctly synchronized in a very fast manner, the value of the peak level is also rapidly corrected to the appropriate value.

On top of this the circuit arrangement operates in a very reliable and interference-free manner as all those interferences which are present in the television signal in the level direction of the synchronizing pulses, but which do not reach their level, are suppressed and to not result in a disturbance of the synchronization of subsequent circuit arrangements, for example, a phase control loop.

In accordance with a further embodiment of the invention the instant at which the stored sampling values are erased in all intervals is located at the end of the active portion, including the picture content, of each picture line or each field.

Starting from the instant at which the memory is clear, the marker pulse appearing next will with a comparatively high degree of probability already be that marker pulse which represents a detection of the actual synchronizing pulse, as shortly before the erasing procedure the blanking interval, and in this interval the synchronizing pulse occurs. With an undisturbed television signal no further marker pulses will appear after this first marker pulse.

In accordance with a still further embodiment of the invention, the circuit arrangement is followed by a digital phase control loop including a counter 50 that erasing the stored sampling value is triggered at a predetermined counting position of the counter.

A digital circuit arrangement in accordance with the invention will generally be followed by a digital phase control loop. Digital phase control loops include a counter which in the phase comparator has for its object to determine the phase difference between the signal from the phase control loop and an external applied signal. Advantageously, this counter can simultaneously be used to effect, at predetermined time intervals between two consecutive synchronizing pulses, erasing of the sampling value store.

In a further embodiment of the invention the marker pulses are applied to a phase comparator included in the phase control loop and only the last phase measuring value determined before the predetermined counting position is applied to a loop filter arranged subsequent to the phase comparator.

With digital phase control loops it is possible in a simple manner to further process only one phase measuring value from a plurality of phase measuring values determined in a time interval, i.e. by applying it, for example, to a subsequent loop filter. Thus, in the circuit it is possible to evaluate in a simple manner only the last marker pulse before an erasing procedure of the store.

BRIEF DESCRIPTION OF THE DRAWINGS

An embodiment of the invention will now be described in greater detail with reference to the accompanying drawing, in which.

DESCRIPTION OF THE PREFERRED EMBODIMENTS

Figure 1:
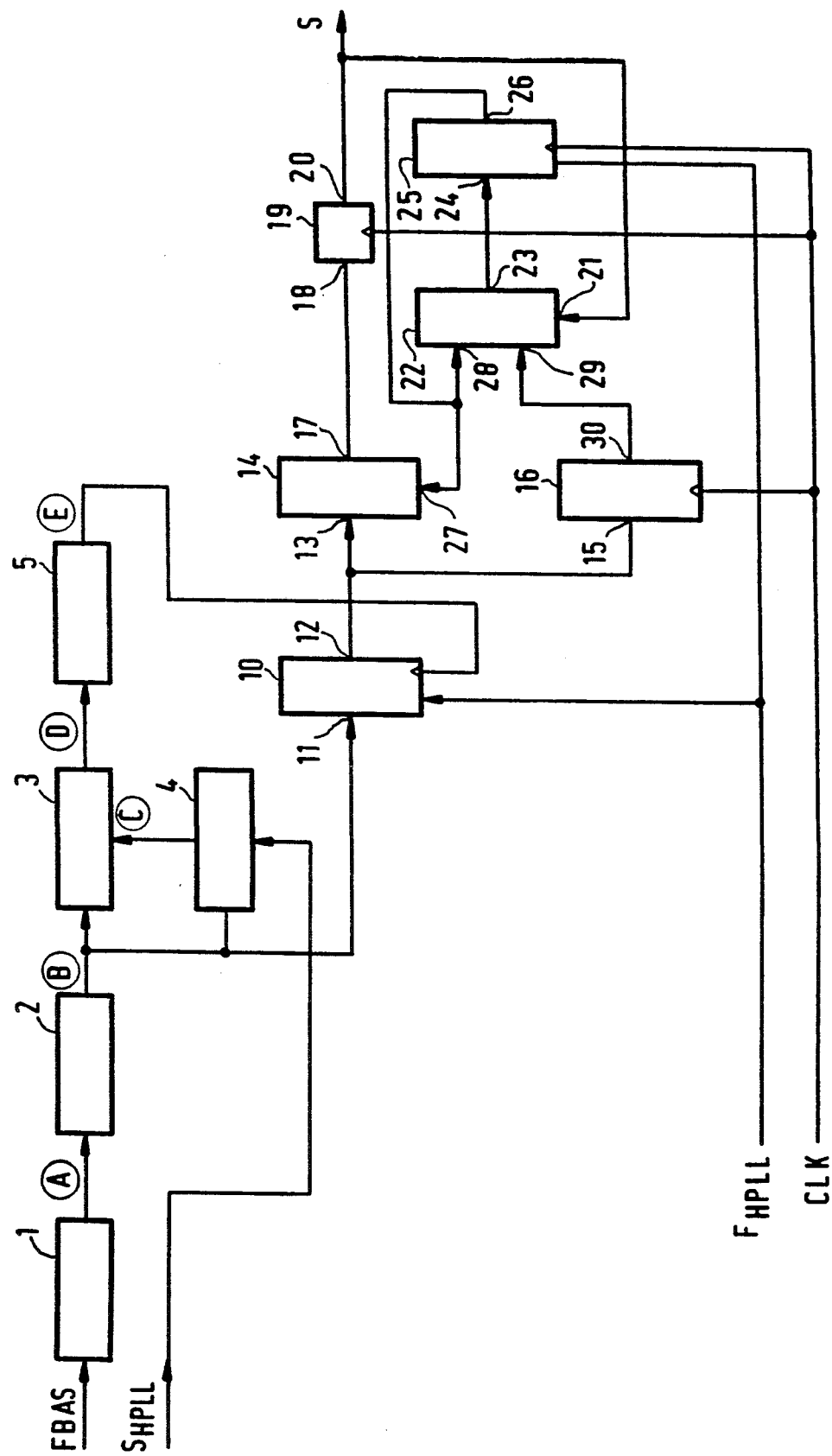
FIG. 1 is a basic circuit diagram of a digital circuit arrangement for the detection of horizontal synchronizing pulses.

A basic circuit diagram shown in FIG. 1 illustrates a circuit arrangement for the detection of horizontal synchronizing pulses. This circuit arrangement operates with a separating stage which at predetermined intervals determines the level of the television signal and determines the cut-off level in dependence on this level.

The actual circuit arrangement for detecting the synchronizing pulses follows a low-pass filter 1, in which high-frequency signal portions are removed from a digital television signal applied to the low-pass filter. The low-pass filter is followed by a comparator 2. In this comparator 2 the output signal of the low-pass filter 1 is first inverted and then compared to a fixed cut-off level. This cut-off level has been chosen such that above all it separates the active signal portions which contain the picture content. In the comparator 2 separation of the synchronizing pulses is not yet effected. Subsequent to the comparator 2 there is a further comparator 3 which separates those signal portions from the signals produced by the comparator 2 that exceed a variable cut-off level in the direction towards the peak level. This variable cut-off level is determined with the aid of a synchronization amplifier 4, which at predetermined intervals determines the level of the signal produced by the comparator 2 and fixes the variable cut-off level at half the amplitude of this determined peak value. The synchronization amplifier 4 can be controlled by means of, for example, a phase control loop, not shown, which is arranged subsequent to the circuit arrangement shown in FIG. 1.

The comparator 3 is followed by a pulse shaper 5, which detects the positive edges of the signal produced by the comparator 3 and generates a pulse after a presettable time delay.

The pulses generated by the pulse shaper 5 are applied to the digital circuit arrangement for detecting the horizontal synchronizing pulses and have for their object to clock therein a register 10 whose signal input 11 receives the digital, low-pass filtered, inverted television signal which, in the comparator 2, was compared to a fixed cut-off level. An output 12 of the register 10 is applied to a first input 13 of a comparator 14 and to an input 15 of a register 16. An output 17 of the comparator 14 is connected to an input 18 of a further register 19, whose output 20 supplies the marker pulses the output 20 also is connected to an input 21 of a multiplexer 22. An output 23 of the multiplexer 22 is connected to an input 24 of a register 25 which, along with the register 19, is clocked by a clock signal Clk, which corresponds to the sampling rate of the digital television signal. An output 26 of the register 25 is connected to a second input 27 of the comparator 14 and also to a first input 28 of the multiplexer 22. A second input 29 of the multiplexer 22 is connected to an output 30 of the register 16. This register is also clocked by the clock signal Clk.

The registers 16 and 19 are reset by means of a signal which occurs at presettable instants between two synchronizing pulses and which may be taken, for example, from a phase control loop, not shown in the Figure, which is arranged subsequent to the circuit arrangement.

The mode of operation of the circuit arrangement shown in FIG. 1 will now be described in greater detail with reference to some signals occurring in the circuit arrangement and shown in FIGS. 2 and 3.

Figure 2:
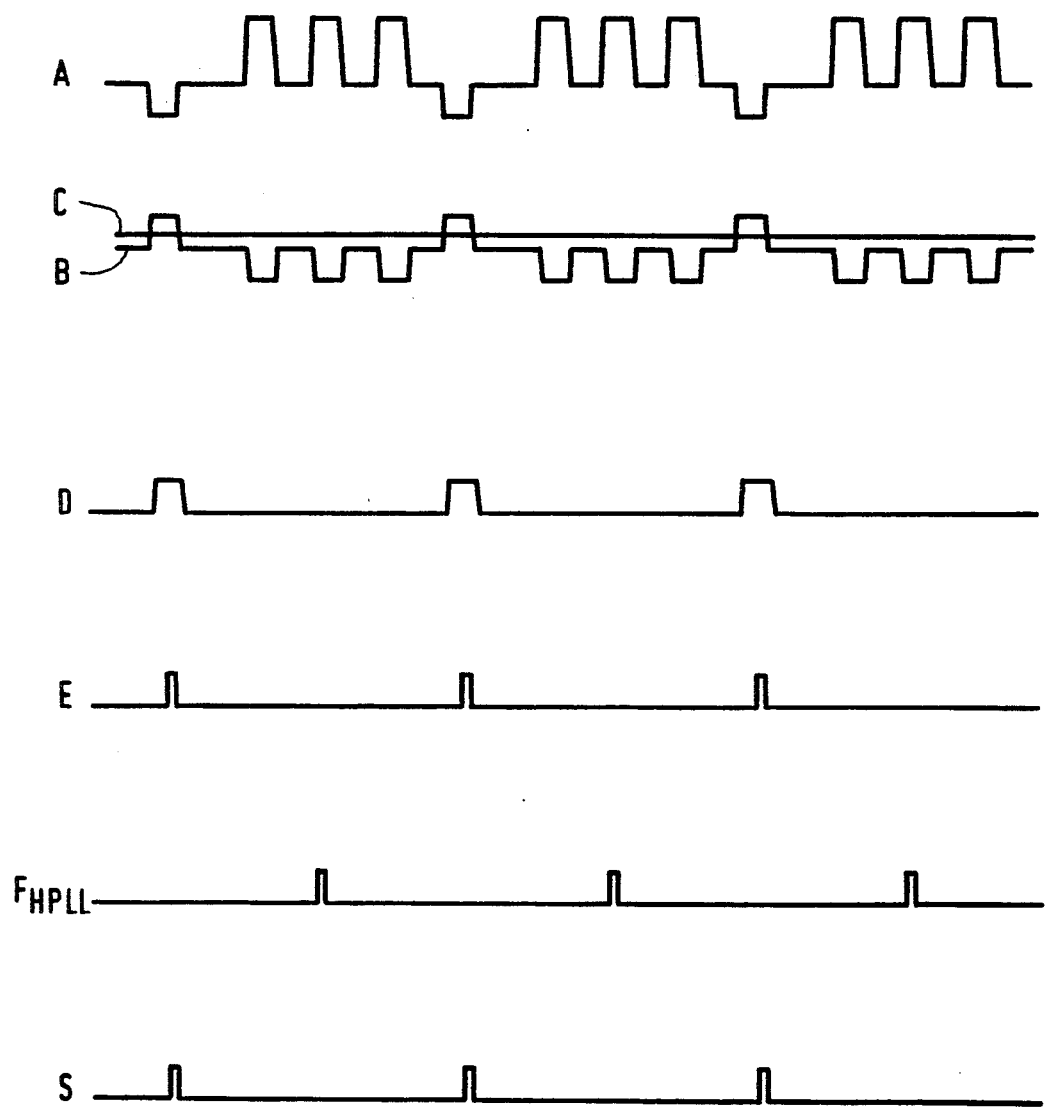
FIG. 2 shows the variation versus time of a few signals occurring in the circuit arrangement of FIG. 1 when the cut-off level is correctly determined.

The representation in FIG. 2 is based on the fact that the cut-off level determined in the synchronization amplifier 4 has a correct value.

FIG. 2 shows a signal A which represents the output signal of the low-pass filter 1. This signal is a digital television signal, which in the representation of FIG. 2 is shown for approximately three picture lines. It should be noted that the signal in FIG. 2 is shown in analog form for the sake of clarity. In actual practice discrete sampling values of a digital television signal are involved.

A signal B which is also shown in FIG. 2 represents the inverted signal A which is compared with a fixed cut-off level, not shown in FIG. 2, which above all has for its object to separate the active signal portions. The signal B represents the output signal of the comparator 2.

In the comparator 3 the signal B is compared with a cut-off level which is generated in the synchronization amplifier 4 and is represented in the Figure by means of the signal variation C. When this comparison is effected in the comparator 3, those signal portions of the signal B are separated that exceed the cut-off level C in a direction towards the synchronizing pulses or the peak levels, respectively. These separated signal portions represent the output signal of the comparator 3 and are shown in FIG. 2 by means of a signal variation D. It will be obvious that pulses occur in the signal variation D only when the level of the signal B is above the cut-off level C.

The pulses D are further processed in the pulse shaper 5 which, after each positive edge of the signal D, generates a pulse after a presettable time delay which can, for example, be produced by means of a counter. These output pulses of the pulse shaper 5 are represented in FIG. 2 by means of a signal variation E.

It should here be noted that the pulses in accordance with the signal variation E are directly used, in accordance with the present state of the art, as detected synchronizing pulses, and therefore are, for example, applied to a subsequent phase control loop.

In the circuit arrangement shown in FIG. 1, the pulses E have however, the additional task of clocking the register 10. A new value of the signal B is then always entered into the register 10 when the pulse signal E appears. In the comparator 14 the sampling value stored in the register 10 is compared to a sampling value stored in the register 25. Since a new sampling value is only entered into the register 10 when a pulse E occurs, a new comparison in the comparator 14 is effected only when signal portions of the television signal are separated in the comparator 3. If the sampling value stored in the register 10 exceeds the sampling value stored in the register 25, then the comparator 14 produces a pulse at its output 17 which is entered into the register 19. At the next clock pulse of the clock signal Clk this pulse appears at the output 20 of the register 19 and represents a marker pulses. This pulse is at the same time used to switch the multiplexer 22 from its input 28 to its input 29. As a result, the actual sampling value which was previously entered into the register 16 and stored in the register 10 is applied to the input 24 of the register 25 and is stored in this register at the subsequent clock pulse Clk. The ultimate result is that, provided a pulse appears in the signal E, an instantaneous sampling value is always then entered into the register 25 when the instantaneous sampling value stored in the register 10 exceeds the sampling value which has previously been stored in the register 25.

The output signal of the register 19, which both represents the marker pulse and the control signal for the multiplexer 22, is shown in FIG. 2 by means of a signal variation S. In the case illustrated in FIG. 2, in which the cut-off level C has correctly been determined, pulses occur in this signal S only at those instants in which the signal A or B includes a synchronizing pulse.

FIG. 2 further shows a signal $F_{HPLL}$ which has for its object to reset the registers 10 and 25 at presettable instants. This signal can, for example, be taken from a phase control loop which is not shown in the Figure and follows immediately after the circuit arrangement. At each pulse of the signal $F_{HPLL}$ the comparison of the instantaneous sampling values to the stored sampling values is started again from the beginning in a manner such that first a comparison to the signal value zero is effected, as the register 25 was cleared by means of the pulse of the signal $F_{HPLL}$. As a result, the first sampling value entered into the register 10 upon receipt of a pulse signal E is also entered into the register 25, as the sampling value entered into the register 10 will generally exceed zero. Thereafter new sampling values are then entered into the register 25 only when they exceed the sampling value which was previously stored in this register and when simultaneously a pulse E occurs.

In the example shown in FIG. 2, the register 25 is again loaded only once in the time interval between two pulses of the signal $F_{HPLL}$ as in this interval the television signal exceeds the variable cut-off level only once. This is caused by the fact that in this example, the variable cut-off level was determined correctly in response to signal C.

Figure 3:
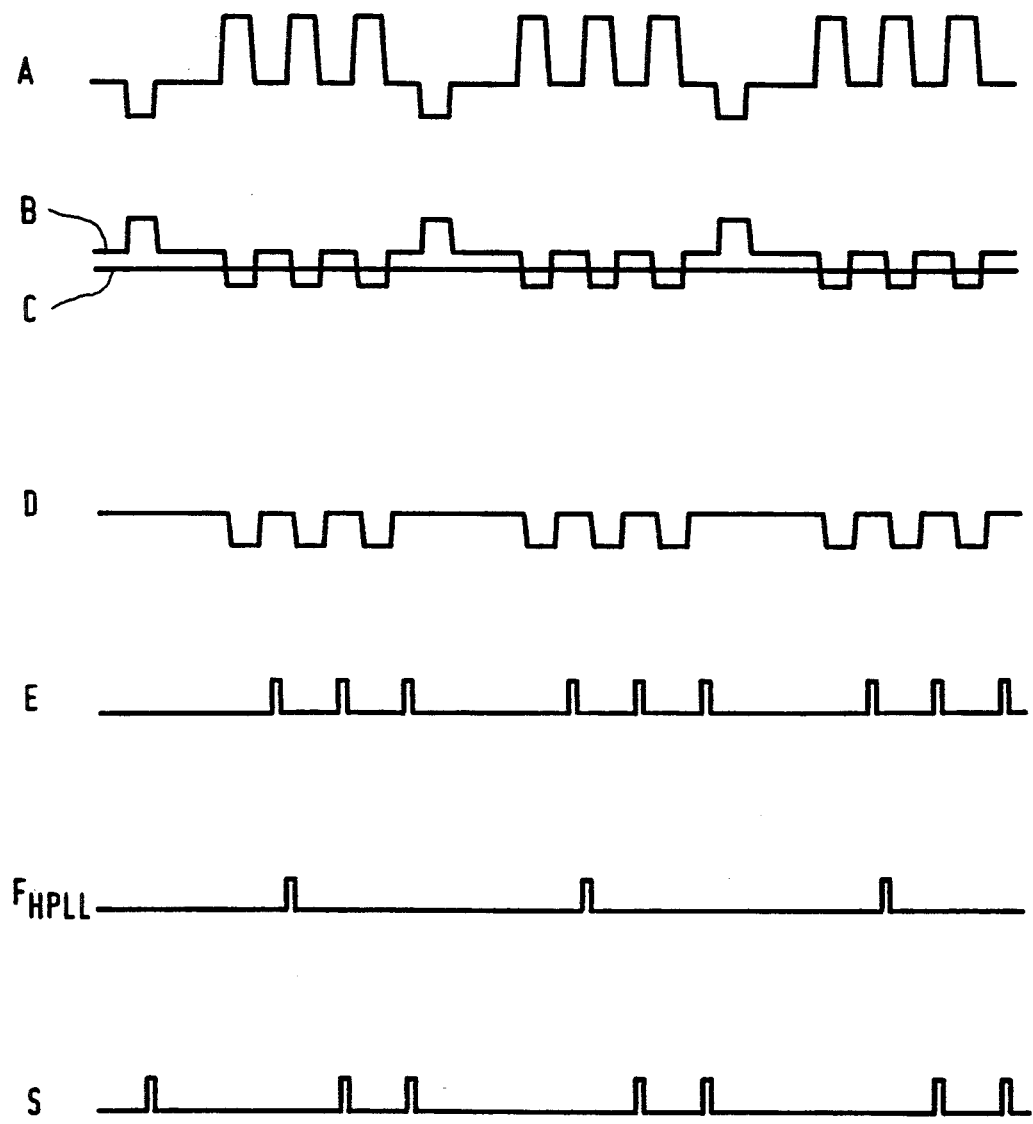
FIG. 3 shows the signals of FIG. 2 for the case in which the cut-off level is incorrectly determined.

FIG. 3 shows the same signals as in FIG. 2, the difference being that in this case the variable cut-off level C has been determined incorrectly. This is due to the fact that the instants at which the synchronization amplifier 4 determines the level of the television signal, in dependence whereon the variable cut-off level is then determined, have been selected incorrectly. If these instants are, for example, taken from a phase control loop arranged subsequent to the circuit arrangement of FIG. 1, then this is caused by the fact that the phase control loop has not been correctly synchronized.

The signal variations A and B shown in FIG. 3 are identical to the signal variations of FIG. 2.

The variable cut-off level in accordance with signal variation C has however, because of the above-described relations, an incorrect value. As a result, not only the synchronizing pulses together with the porch are separated, but also signal portions. In the example shown in FIG. 3, this causes the signal D, i.e. the output signal of the comparator 3, change its value several times between two synchronizing pulse A. A pulse of the signal E is generated in the pulse shaper 5 in response to each positive edge of the signal D. A new sampling value is entered into the register 10 in response to each pulse of the signal E and by means of the comparator 14 this sampling value is compared with the sampling value which was previously stored in the register 25. This procedure starts again from the beginning of each pulse of the signal $F_{HPLL}$.

In the example shown in FIG. 3, two marker pulses are each time generated between two pulses of the signal $F_{HPLL}$. A first marker pulse S is generated after receipt of the pulse of signal $F_{HPLL}$ because at this instant, signal portions of the television signal are separated and the associated sampling value exceeds the sampling value stored in the register 25, which at this instant still has the value zero.

The subsequent, second marker pulse is generated, as at that instant a signal pulse E likewise occurs, which means that signal portions are separated from the television signal, and in addition thereto the associated sampling value of the signal B exceeds the sampling value which is associated with the first pulse of the respective signals E and S. In the example shown in FIG. 3, this is therefore the case because the second marker pulse originates from the edge of the porch, which in the case of the inverted signal B has a somewhat higher signal value than the value of the active signal which contains the picture content and is associated with the first pulse.

The marker pulse of the signal S which always occurs last between two erase procedures of the sampling value store, which procedure is effected by means of the pulse of the signal $F_{HPLL}$, marks a detected synchronizing pulse.

In the example shown in FIG. 3, in which the value of the cut-off level in accordance with signal variation C has been determined in a rough, incorrect manner, this last synchronizing pulse before the erase procedure is triggered by the porch. As the porch is however relatively short in the region before the synchronizing pulse, this marker pulse is arranged only slightly incorrectly in time compared with the synchronizing pulse which is indeed contained in the signal B. A phase control loop which is, for example, arranged immediately subsequent to the arrangement will however, already be substantially correctly synchronized. As a result, those instants at which the synchronization amplifier detects the level of the signal B for the determination of the value of the variable cut-off level are also already substantially correct. This results in the cut-off level being slowly increased. In the course of this increase of the cut-off level C, the synchronizing pulse is then already detected at the accurate instant, so that the phase control loop is accurately synchronized. This again results in the cut-off level being still further increased, as now a level check is effected at the correct instants by means of the synchronization amplifier, until the value of the cut-off level C shown in FIG. 2 is reached. Thus, starting from the desynchronized state of a subsequent phase control loop, shown in FIG. 3, a correctly synchronized state is achieved in which the signal variations shown in FIG. 2 then occur.

The separating stage used in the circuit arrangement of FIG. 1, which is assembled from the comparators 2 and 3, the synchronization amplifier 4 and the pulse shaper 5, may obviously be of a much simpler structure. It can, for example, be implemented only by means of the synchronization amplifier 4 and the comparator 3. In addition thereto, the cut-off level can alternatively be determined in a different manner, for example, when it is tried to detect the edges of the synchronizing pulses by measuring their edge steepness.

I claim:

1. A digital circuit arrangement for detecting horizontal or vertical synchronizing pulses in a digital television signal and whose amplitude extends to approximately a peak level, comprising: a separating stage which separates those signal portions of the television signals that exceed a cut-off level in the direction of a peak level, a level detector responsive to an output signal of the separating stage and which, during time intervals in which television signal portions are separated in the separating stage and simultaneously an instantaneous sampling value exceeds a stored sampling value in the level direction of the synchronizing pulses, causes the stored sampling value to be replaced by the instantaneous sampling value and a marker pulse to be generated, and means for erasing, in each time interval between consecutive synchronizing pulses, the stored sampling value at a predetermined instant which is the same for all the time intervals, whereby a last marker pulse before erasing of the stored sampling value marks a detected synchronizing pulse.

2. A digital circuit arrangement as claimed in claim 1 wherein, in all intervals, the means for erasing erases the stored sampling value at an instant which occurs at an end of an active portion of a picture line that contains the picture content.

3. A digital circuit arrangement as claimed in claim 2, wherein said erasing means includes a digital phase control loop including a counter and coupled subsequent to the circuit arrangement such that erasing of the stored sampling value is triggered at a presettable counting position of the counter.

4. A digital circuit arrangement as claimed in any one of the claims 1 to 3 wherein, the level detector comprises a comparator which, during time intervals in which television signal portions are separated in the separating stage, compares the instantaneous sampling value of the television signal to a sampling value stored in a store and, if the instantaneous sampling value in the direction of the level of the synchronizing pulse exceeds the stored sampling value, generates a signal for storing the instantaneous sampling value in the store.

5. A digital circuit arrangement as claimed in claim 4, wherein the signal for storing the instantaneous sampling value is also used as the marker pulse.

6. A digital circuit for detecting synchronizing pulses in a composite TV signal comprising:
   a separating stage which separates TV signal portions of a composite TV signal that exceed a threshold level,
   means for applying a composite TV signal to an input of said separating stage,
   a level detector responsive at least to a pulse-type output signal of the separating stage, said level detector including a storage device for a stored sampling value of the TV signal and means for comparing an instantaneous sampling value of the TV signal with said stored sampling value so that, during time intervals in which the TV signal portions are separated in the separating stage and simultaneously the instantaneous sampling value exceeds the stored sampling value, the comparing means causes a marker pulse to be generated and causes a transfer device to replace the stored sampling value in the storage device with the instantaneous sampling value, and
   means for erasing, at a predetermined time in each time interval between consecutive synchronizing pulses, the stored sampling value, whereby a last marker pulse before erasing of the stored sampling values marks a detected synchronizing pulse.

7. A digital circuit as claimed in claim 6 wherein said storage device comprises a first register, and said level detector further comprises:
   a second register for storing said instantaneous sampling value, said comparing means comprising a comparator having first and second inputs coupled to said first and second registers, respectively, and said transfer device includes switching means coupled to said first and second registers and controlled by said marker pulse.

8. A digital circuit as claimed in claims 6 or 7 wherein said separating stage comprises:

a first comparator which receives the composite TV signal and compares said signal to a fixed threshold level, a synchronization amplifier having an input coupled to an output of the first comparator and an output at which an adjustable threshold voltage is produced, a second comparator having first and second inputs coupled to an output of the first comparator and to said output of the synchronization amplifier, and a pulse-shaper circuit having an input coupled to an output of the second comparator and an output for supplying said pulse-type output signal to the level detector.

* * * * *